A. BARK.
LUGGAGE CARRIER FOR AUTOMOBILES.
APPLICATION FILED MAR. 17, 1919.

1,310,593. Patented July 22, 1919.

INVENTOR
ANDREW BARK.
BY
J. L. Rivers
ATTORNEY

UNITED STATES PATENT OFFICE.

ANDREW BARK, OF SEATTLE, WASHINGTON.

LUGGAGE-CARRIER FOR AUTOMOBILES.

1,310,593.    Specification of Letters Patent.    Patented July 22, 1919.

Application filed March 17, 1919. Serial No. 283,265.

*To all whom it may concern:*

Be it known that I, ANDREW BARK, a citizen of the United States, residing at Seattle, in the county of King and State of Washington, have invented a new and useful Luggage-Carrier for Automobiles, of which the following is a specification.

My invention relates to new and useful improvements in luggage carriers for automobiles which devices are detachably mounted to the front and rear mud guards, the running board, or either of them, for carrying parcels or the like.

I attain these objects by the devices illustrated in the accompanying drawing, in which—

Similar numerals refer to similar parts throughout the several views.

Figure 1:
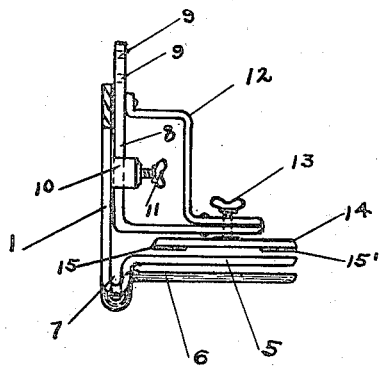
Figure 1 represents a section of a clamp and gate supporting member attachable to a mud guard of an automobile, the same being drawn on line $x$—$x$ of Fig. 2.
Figure 2:
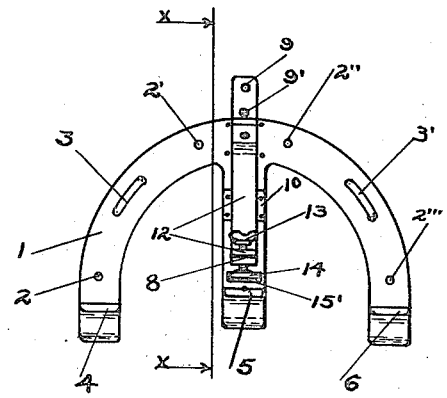
Fig. 2 is an elevation of said clamp and gate supporting member.

The device consists of a clamp and gate supporting member illustrated in Fig. 1, adapted to be clamped to a mud guard of an automobile, the head or gate retaining member extending on a plane practically the same as the outer edge of the mud guard. The same is further illustrated in Fig. 2, the line $x$—$x$ being drawn on that section of the device as shown in Fig. 1. 1 is the head or gate supporting member, substantially semicircular in form, provided with a plurality of openings 2, 2', 2'', 2''', and slots 3 and 3'. 4, 5 and 6 represent three arms, their free ends extending in a plane substantially at right angles with the head 1. These arms are an integral part of the base and are bent, as shown at 7, to substantially conform to the outer side flange of a mud guard. This bight will vary somewhat, in adapting the device to different forms of guards. The arm 5 extends in a plane slightly above that occupied by the arms 4 and 6 in order to make it conform more snugly to the inner surface of a mud guard.

8 represents a member substantially L shaped, carrying a plurality of openings, 9 and 9', in its upper portion. This member is slidably engaged in the part 10, and adjustably held in position by the winged bolt 11. An inverted L shaped member, 12, Fig. 1, with an offset toe at the upper end and an offset arm at the lower end, is attached to the member 8, serving as a reinforcement or brace and also as a handle for adjusting said last mentioned member in different positions. The application of this brace is optional, as the clamp is operative without it. A winged bolt 13 extends through said arm and the L shaped member 8, said bolt being threaded in the member 8 and rotatingly attached to the clamping member 14, carrying at the under side felt or other suitable material, 15 and 15', adapted to engage the upper surface of a mud guard.

Figure 3:
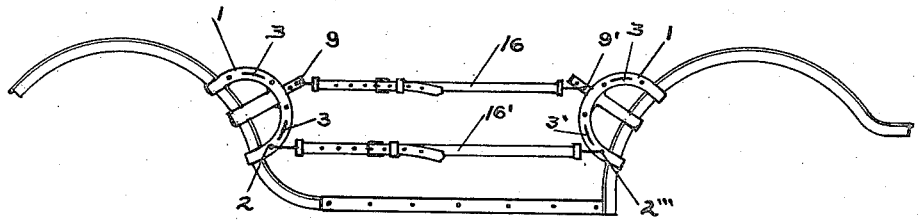
Fig. 3 is a side elevation of the mud guards and running board of an automobile showing the carrier attached to the mud guards.

In applying the device as shown in Fig. 3, the arms 4, 5 and 6 are extended underneath the outer edge of the front mud guard, the bend 7 fitting said edge and the flange snugly. The L shaped member 8 and the clamping member 14 are then slidably adjusted to the upper surface of the mud guard, 8 is clamped in position by the winged bolt 11, and the clamping member 14 by means of the winged bolt 13 clamps the device tightly in position on the mud guard, leaving the head extending as shown in Fig. 3. Another clamping and gate holding device identical in construction with the first is oppositely located over the rear mud guard, as shown in Fig. 3. Gates of different descriptions can be used in this device, but in this Fig. 3 straps 16 and 16' are utilized for inclosing sections of the mud guards and the running board as a carrier. These are fastened to the holes 2, 2''', 9 or 9', by means of hooks extending from the ends of the straps. If desired, straps can be inserted in the slots 3 and 3', wooden slats, rods, metal strips, a wooden gate, or other means can be attached to the gate holding members 1 by winged bolts or other devices, for the purpose of inclosing the running board and mud guards as a luggage carrier.

Figure 4:
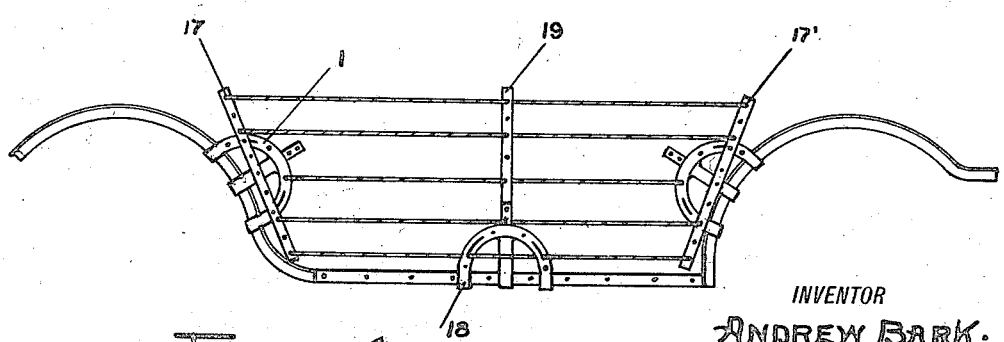
Fig. 4 is a modified form of the carrier as attached to the mud guards and running board of an automobile.

Fig. 4 illustrates a modified form of my invention. The clamping and gate holding members are mounted as heretofore; to them is attached by winged bolts, or other means, the rods 17 and 17', which are provided with a plurality of holes to permit adjustment in different positions on the gate holding members. A clamping and auxiliary gate holding member 18 is also provided for the running board. This device is identical with that shown in Fig. 1, except that the bight illustrated at 7 of Fig. 1, in this clamping and auxiliary gate holding member is now a bend substantially at right angles, and the arms are all in the same plane so as to conform to the outer edge and lower surface of the running board. A rod 19, provided with a plurality of openings, is bolted to this member to afford additional support to the gate. If desired this member 18, with or without the rod 19, can be attached to the running board and a gate attached to it which will inclose the running board and sections of the guards, without the use of any other clamps. In Fig. 4 rope is shown as inclosing the parcel carrying space, but wire netting, canvas, fiber board, wooden boards and similar means can be used with these clamps and projections for inclosing the area desired.

Particular attention is called to the fact that in this device, the clamps with their projecting heads, can be used as parcel carriers without any intermediate inclosing means. The clamps will fit the guards at any section. If it is desired to carry tent poles or a ladder on an automobile, the clamps can be attached to the apexes of the front and rear guards, and the poles or ladder strapped to them, thus utilizing the top of the mud guards for carrying objects, as well as the lower portions and the running board. The clamping section having three arms, 4, 5 and 6, extending under the mud guard for the greater portion of its width, the bight 7 conforming to the outer flange of the guard, and the clamping member engaging the upper surface of the guard being practically the same length as the arms, makes the clamping device and gate holding member, when in operative position, as strong as the mud guard itself. A barrel of flour can be carried on an automobile with this device; in fact its construction is such as to be limited in strength, only by the strength of the guard. In this carrier everything that might have a tendency to rattle is bolted tight, and whether straps, ropes, metal bars or a gate of wood is used as inclosing means, the carrier can be made, absolutely noiseless. With the use of the clamping and gate holding member 1 and the similar device 18, shown in Fig. 4, and the elimination of the third clamping and folding member from one of the guards, one-half only of the running board can be inclosed, if desired, as a parcel carrier, allowing ingress or egress from either side. The strength of these clamps, their adjustability to any section of the mud guards or running board, the fact that common and convenient inclosing means, such as ropes, straps, etc., can be utilized, and the capacity of this carrier for bulky articles, give it a range of usefulness and adaptability, applicant believes, possessed by no other automobile luggage carrier.

Having thus described my invention, I claim:

1. An automobile luggage carrier in combination with a mud guard of an automobile, comprising a gate retaining and article holding member in form substantially an inverted U, means for fastening articles thereto, as an integral part thereof, a longitudinally extending section in equally spaced relation with the sides of said member and in the plane thereof, said section being slightly shorter in length than said member, the ends of said section and said member carrying arms the ends of which lie in a plane substantially at right angles thereto, a bight being made in each arm to conform substantially to the outer flange of the mud guard, the free ends of said arms adapted to extend underneath said guard and to engage the lower periphery thereof for the greater portion of its width, an L shaped member slidably connected with the inner surface of said section, adapted to afford support and adjustment to clamping means, means for bracing said L shaped member, means for holding it in adjusted position, a winged bolt operating through said brace and said L shaped member, carrying on its lower end a clamping member adapted to engage the upper periphery of said guard.

2. An automobile luggage carrier comprising in combination with the front and rear mud guards and running board of an automobile, a clamp and article holding head as set forth in claim 1, clampingly attached to a front mud guard of an automobile, another device of the same construction oppositely located and clampingly attached to a rear mud guard of an automobile, a plurality of straps extending between said heads and attached thereto by hooks located adjacent the ends of the straps, adapted to provide a gate for inclosing sections of the mud guards and running board of an automobile.

3. An automobile luggage carrier comprising in combination with the front and rear mud guards and running board of an automobile, two clamps and article holding heads constructed and located as set forth in claim 2, intermediate means extending therebetween and attached thereto, adapted to inclose said mud guards and running board of an automobile, as a luggage carrier.

4. An automobile luggage carrier in combination with a running board of an automobile, comprising a gate retaining and article holding member in form substantially an inverted U, means for fastening articles thereto, as an integral part thereof, a longitudinally extending section in equally spaced relation with the sides of said member, in the plane thereof and of the same length, the ends of said section and said member carrying arms substantially at right angles thereto and adapted to extend underneath said running board and to engage the lower surface thereof for the greater portion of its width, an L shaped member slidably connected with the inner surface of said section, adapted to afford support and adjustment to clamping means, means for bracing said L shaped member, means for holding it in adjusted position, a winged bolt operating through said brace and said L shaped member, carrying on its lower end a clamping member adapted to engage the upper surface of said running board.

5. An automobile luggage carrier comprising in combination with the running board and front and rear mud guards of an automobile, two clamps and article holding heads constructed and located as set forth in claim 2, a support provided with a plurality of openings connected to the outer sides of said heads, a third clamp and article holding head constructed as set forth in claim 4, and clampingly attached to said running board, a vertical support provided with a plurality of openings connected with and extending vertically from said head, said heads and supports adapted to hold means for inclosing the running board and sections of the mud guards of an automobile.

ANDREW BARK.